June 6, 1950 — T. HINDMARCH — 2,510,225

HYDRAULIC CLUTCH

Filed Feb. 24, 1945 — 6 Sheets-Sheet 1

Inventor
T. Hindmarch
By Gliscott Downing Seebold
Attys.

June 6, 1950 T. HINDMARCH 2,510,225
HYDRAULIC CLUTCH

Filed Feb. 24, 1945 6 Sheets-Sheet 2

Inventor
T. Hindmarch

June 6, 1950      T. HINDMARCH      2,510,225
HYDRAULIC CLUTCH
Filed Feb. 24, 1945      6 Sheets-Sheet 3
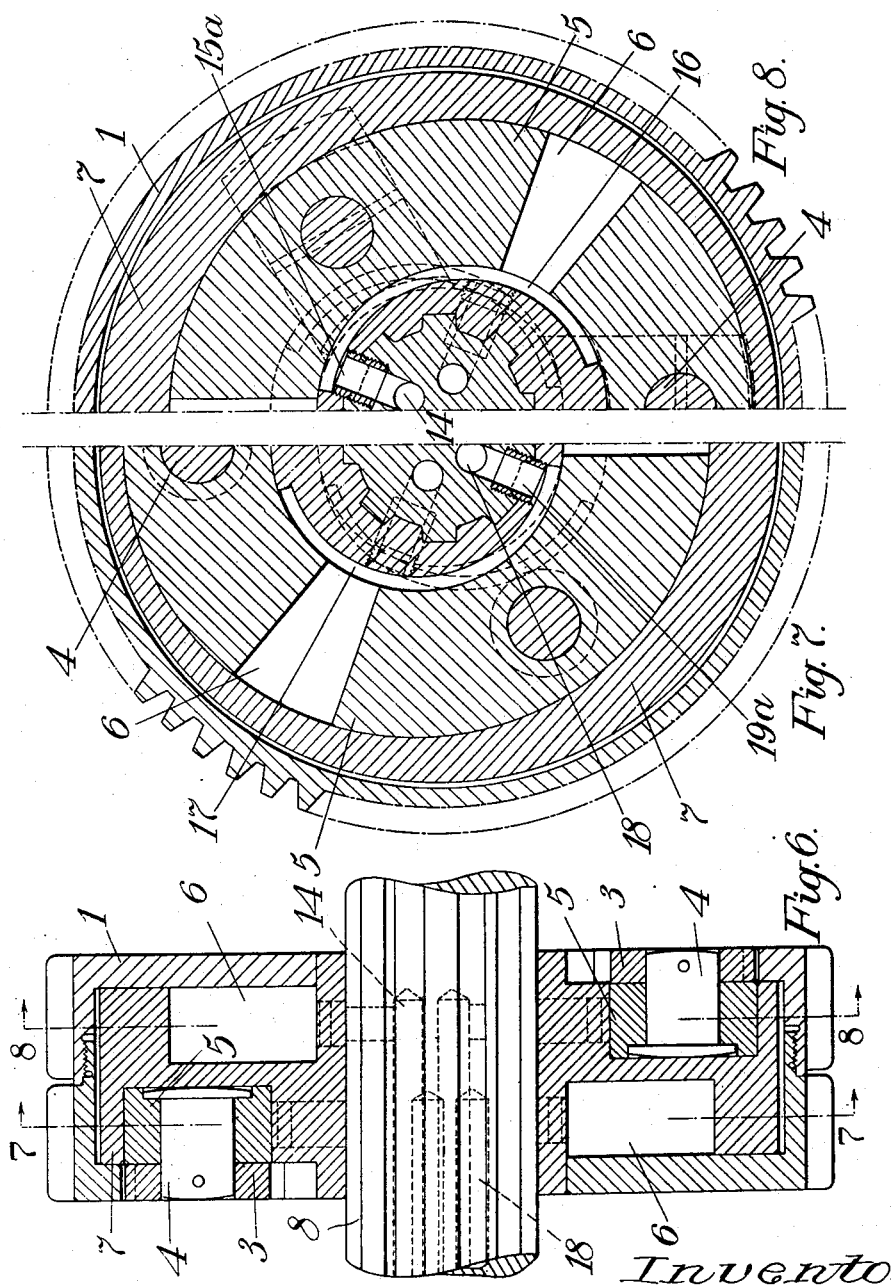
Inventor
T. Hindmarch

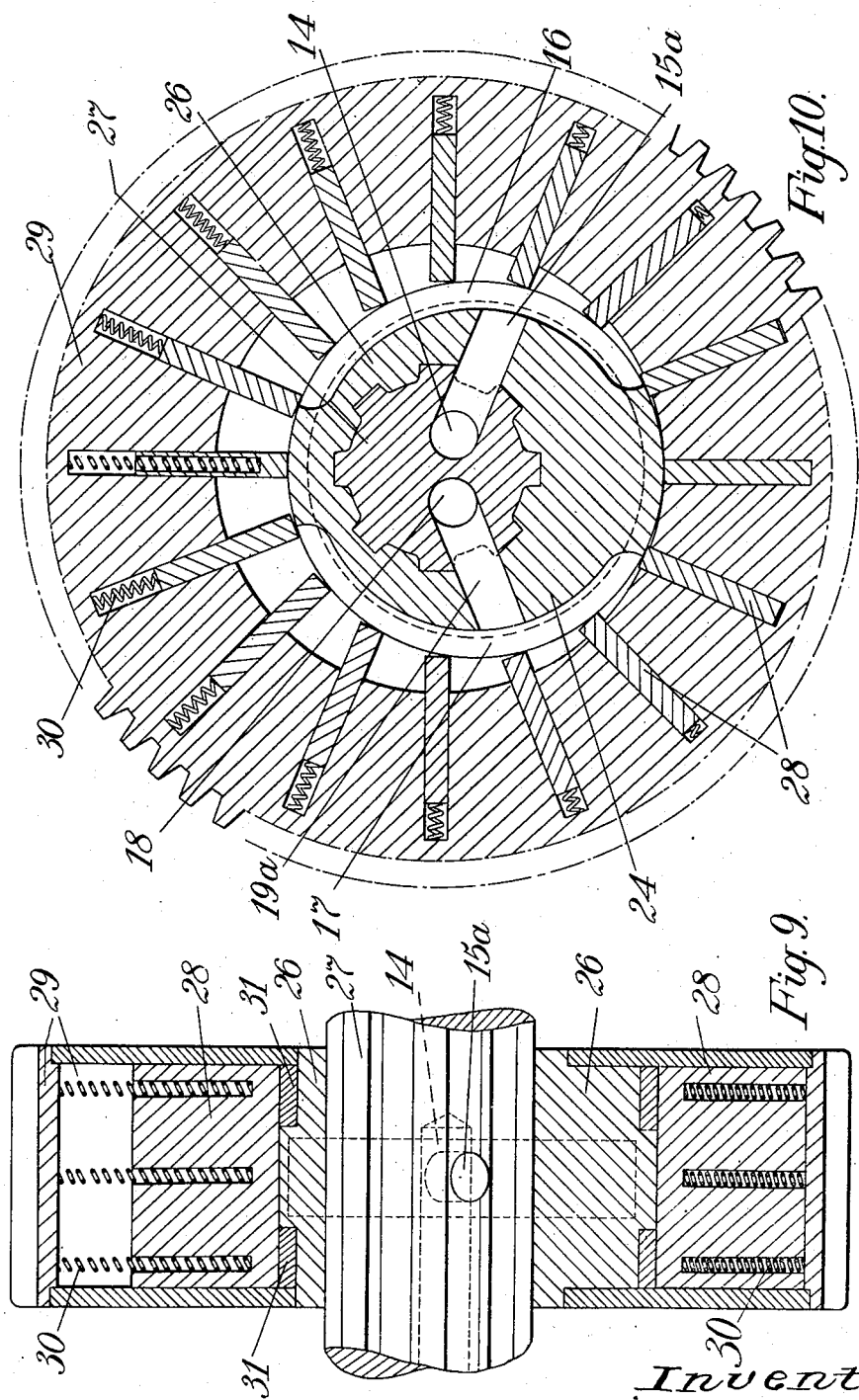

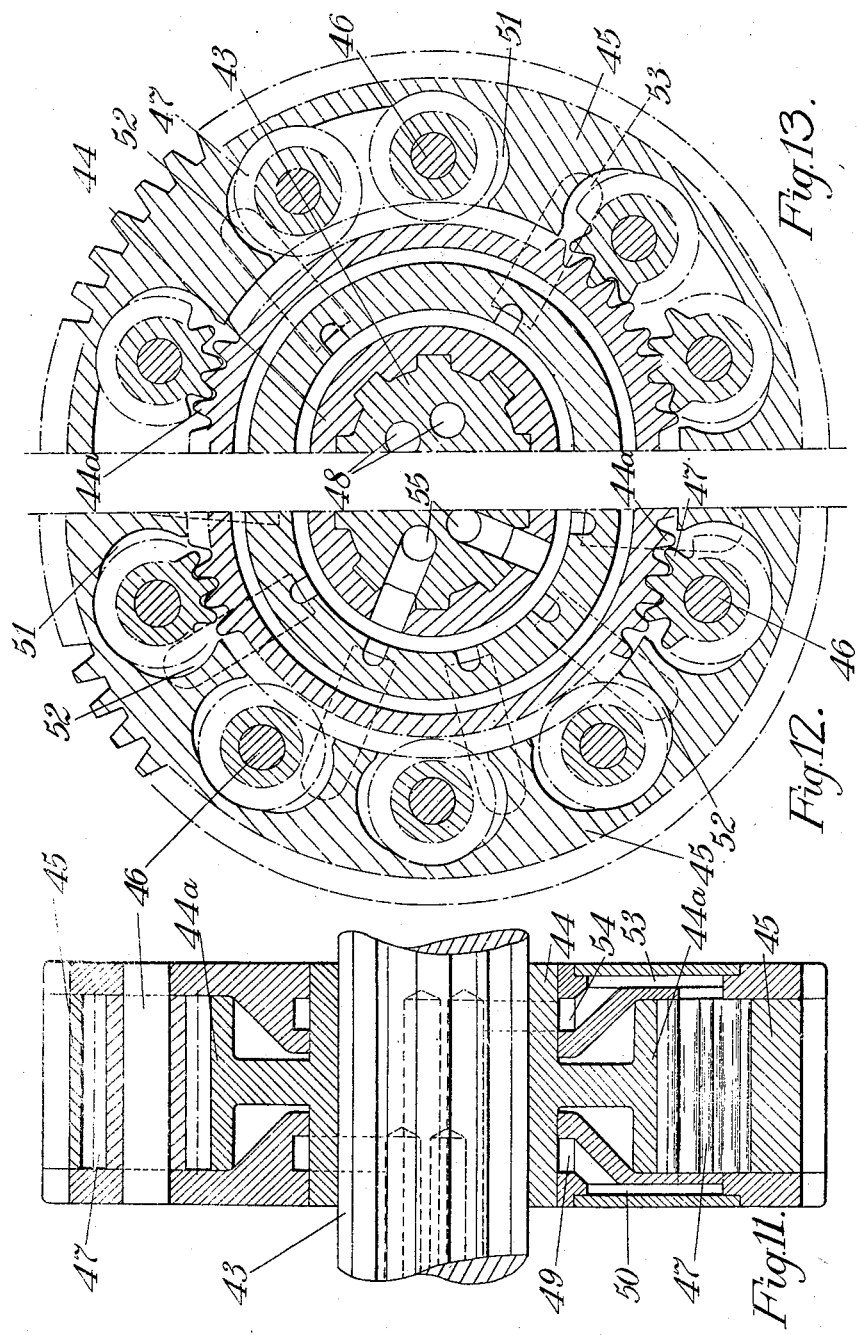

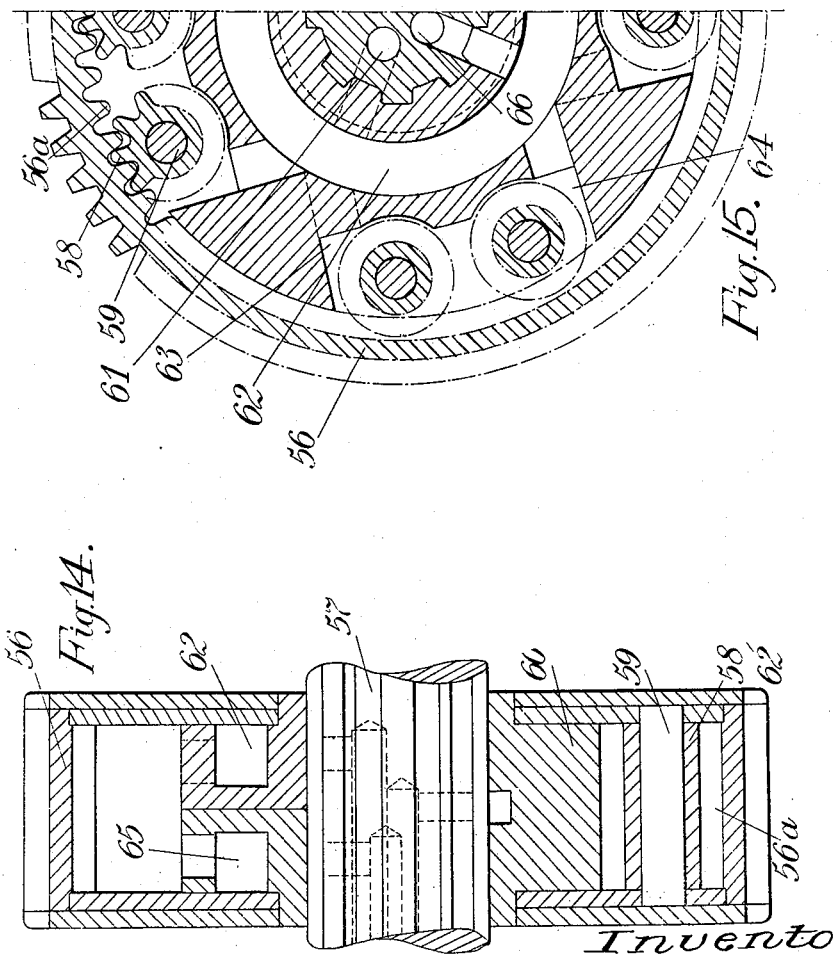

Patented June 6, 1950

2,510,225

UNITED STATES PATENT OFFICE 2,510,225

HYDRAULIC CLUTCH

Thomas Hindmarch, London, England

Application February 24, 1945, Serial No. 579,522
In Great Britain September 18, 1944

5 Claims. (Cl. 192—58)

The object of the present invention is to provide a hydraulic clutch or coupling of simple and compact form and which may be easily manipulated and which will be of particular use in connection with marine propulsion, locomotive, aircraft, road transport and machine drives, and in all cases where it is desired to couple together two shafts or other parts of a drive so that they may be made to rotate together or independently at will. At the same time a clutch or coupling in accordance with the invention will provide convenient means for damping torsional oscillations or cyclic variations and in some applications it may be fitted or used for this purpose only.

A clutch or coupling in accordance with the invention, therefore, is ideally suited for use in gears and power drives for the main propulsion of and auxiliary drives of ships, locomotives and rail-cars, road vehicles, aircraft, tanks and other vehicles and gearing and power drives for all industrial and other purposes.

The invention consists in a hydraulic clutch comprising an input member and an output member, a fluid circuit associated with said input member and said output member through which, under one condition, fluid is allowed to flow freely between the two members to permit free relative rotation of the members, and under another condition, fluid is prevented from flowing between the two members to prevent relative rotation of the members, a control box comprising a fluid inlet channel from the source of supply of the fluid to a non-return valve in said inlet channel, a fluid outlet channel to said source of fluid, a non-return valve in said outlet channel, a control valve associated with said inlet and outlet channels and having passage ways leading to and from the fluid circuit to control a flow of fluid through the said fluid circuit and to and from the source of supply of fluid, and a relief valve to control the pressure to which the fluid can rise in the said fluid circuit.

The torque which can be transmitted by such a clutch or coupling will depend on the size and construction of the device and also on the fluid-pressure existing therein, and in accordance with one feature of the invention I may provide a pressure relief valve in the output part in order to limit the torque transmitted to a predetermined or adjustable value.

The rate of engagement and/or disengagement of the clutch may be controlled by the rate at which the control valve is operated or, alternatively, by adjustment of the above mentioned relief valve or valves to the desired rate of engagement and/or disengagement.

In some applications it will be desirable for the torque to be transmitted in one direction of rotation only allowing free rotation in the opposite direction and this may be provided for in accordance with the invention by arranging the control valve or valves in the form of a non-return valve or valves either directly or indirectly controlled so that the fluid can be supplied freely in one direction of rotation but is restricted or stopped in the reverse direction.

When the torque input to the device varies either due to cyclic variations or torsional oscillations this variation in torque will be damped and smoothed due to the limiting action of the pressure relief valve and/or due also to slight compressibility of the working fluid employed. In some applications the torsional oscillations or cyclic variations in torque may be of large amplitude and in such case I may in accordance with the invention provide additional damping by connecting to the output and/or input parts of the fluid circuit a suitable hydraulic accumulator or pressure ballast chamber.

The fluid supplied to the device may be drawn by the device from a suitable supply tank or sump or, alternatively, it may be supplied to the device under pressure either by means of a static head or, alternatively, by a suitable pump.

Further, in some applications it may be desirable to empty the device of the working fluid when it is disengaged in order to reduce drag and this may be provided for by suitable arrangement of the control valve.

Further features of the invention will be apparent from the description given hereafter.

The accompanying drawings illustrate several modes of carrying out the invention.

Figure 1:
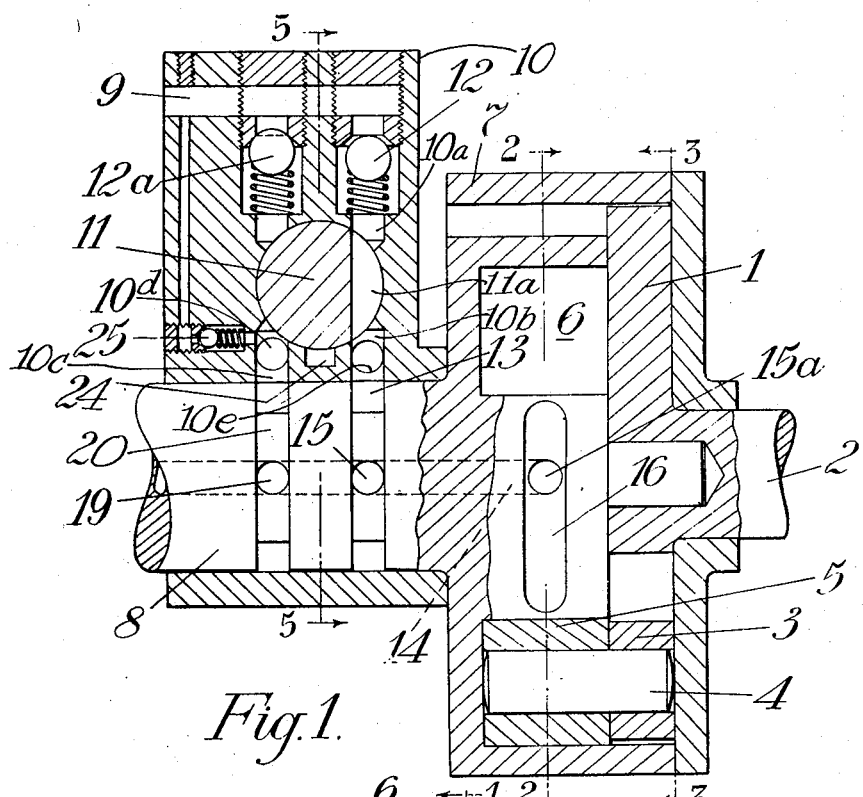
Figure 1 is a section on the line 1—1 of Figure 2 showing one form of clutch in accordance with the invention.
Figure 2:
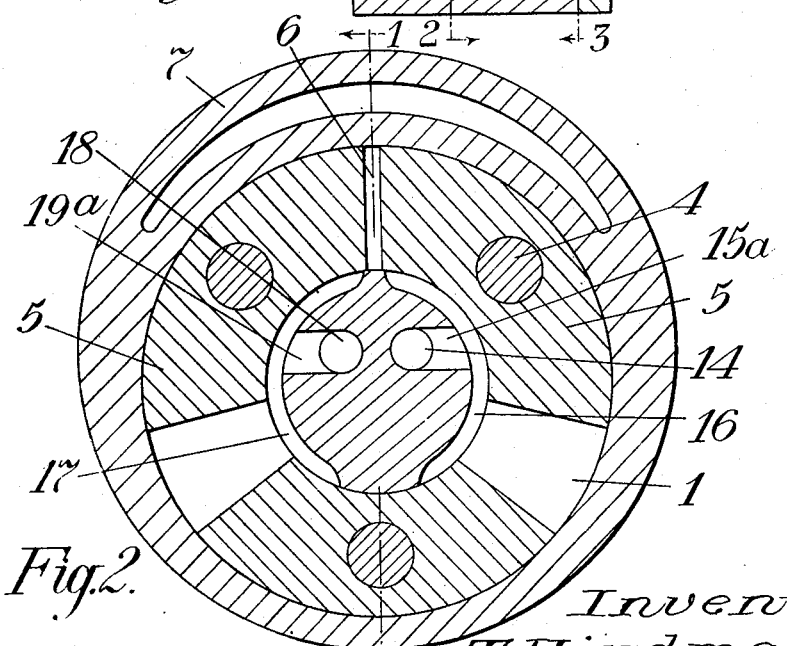
Figure 2 is a section on the line 2—2 of Figure 1.
Figure 3:
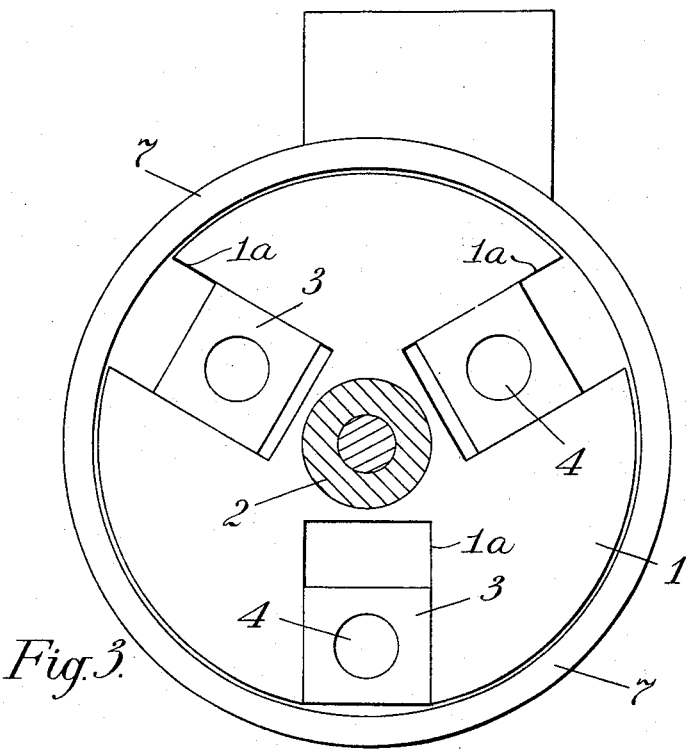
Figure 3 is a section on the line 3—3 of Figure 1.
Figures 4, 5:
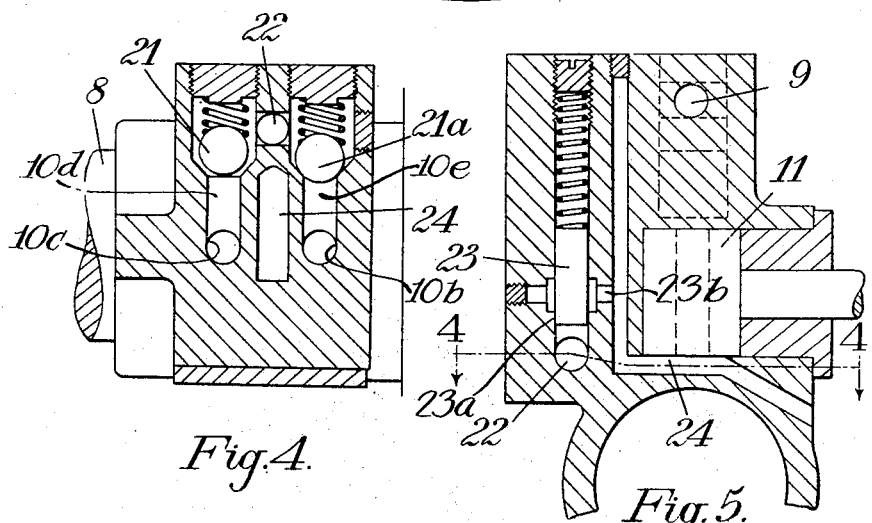
Figure 4 is a section on the line 4—4 of Figure 5.
Figure 5 is a section on the line 5—5 of Figure 1.

Figure 6 is a sectional elevation of a further form of clutch in accordance with the invention, and Figures 7 and 8 are cross-sectional views on the lines 7—7 and 8—8 respectively of Figure 6.

Figure 9 is a similar view to Figure 6 of a further form, and

Figure 10 is a sectional view of Figure 9.

Figures 11, 12 and 13 are respectively a cross-sectional elevation and side sectional elevations of a further form of clutch.

Figures 14 and 15 are similar views of a further form.

In carrying my invention into effect in one convenient manner and in one of its simplest forms when used, for example, to couple an input and an output shaft and as illustrated in Figures 1 to 5, I arrange a driving plate 1 on the input shaft 2 in which I form, say, three radial slots 1a in which are movable blocks 3 carrying pins 4 upon which are mounted three segmental members 5 adapted to run in an eccentric chamber 6 formed in an outer member or housing 7 directly connected to the output shaft 8. Rotation of the input shaft will cause radial movement of the segmental members 5 due to the eccentricity of the channel 6, above referred to, and thus a pumping action is produced by which fluid may be drawn into the device from a suitable supply. The supply leads to a channel 9 in a valve box 10 in which is mounted the control valve 11 adapted for manual operation, and the input and output parts of the device are connected by ports, channels, recesses, or other parts constituting a circuit through which the fluid may flow. For example, in the particular construction illustrated and with the control valve 11 arranged in the clutch engaged position the fluid from the supply channel 9 passes a non-return valve 12, a passage 10a in the valve box, a port 11a in the control valve 11, and thence by way of a radial passage 10b in the valve box, a recess 13, axial hole 14 and radial holes 15 and 15a, in the output shaft 8 to an arcuate channel 16 communicating with the space between the segmental blocks at one side of the shaft 8. The working fluid leaves or tends to leave the chamber 6 by way of a further arcuate channel 17 communicating with the space between the segmental blocks at the opposite side of the shaft 8 and thence by a further set of axial and radial holes 18, 19, 19a and channel 20 in the output shaft 8 and a radial passage 10c in the valve box communicating with a branch passage 10d and a connecting passage 22. A check valve 21 is located in the passage 10d and the passage 22 communicates with the lower end of a chamber 23a containing a spring pressed relief valve 23 which determines the pressure to which the fluid is raised in the system and thus the torque transmitted by the clutch or coupling in its engaged position. Any fluid passed by the relief valve passes by way of a port 23b in the chamber 23a and a further channel 24 to the supply tank or sump. A further set of non-return valves 12a, 21a similar to the two above referred to may be provided for the reverse direction of rotation. In this case the control valve 11 is turned so that the port 11a connects the supply channel 9 with the passages 10c, 20, 19, 18, 19a and 17. The valve 11 closes communication between the passages 10a and 10b while a branch passage 10e connects the passages 10b, 13, 14, 15, 15a and 16 with the connecting passage 22 and the relief valve chamber 23a.

When the clutch or coupling is to be disengaged the control valve 11 is moved so that it shuts off communication from the fluid supply channel 9 to the device and the port 11a connects the high pressure and low pressure parts of the fluid circuit while at the same time opening the waste or outlet channel 24 by which the working fluid is allowed to return to the sump or supply tank. In this condition it will be clear that, apart from friction losses, there is no difference between the pressure or head in the output and input parts and the input part is therefore allowed to rotate freely while the output part remains stationary and the coupling is thus disengaged. In this condition a small amount of oil will normally be supplied via a non-return valve 25 for lubrication purposes.

Figures 6, 7 and 8 illustrate one method of applying the above type of construction to a pinion or wheel. In this case there are two sets of segmental blocks 5. The eccentricity of two channels is made equal and opposite so as to improve the balance. A control valve similar to that shown in Figure 1 is fitted at a suitable point on the shaft, and the action of the device will be similar to that described above.

When used as a pinion or wheel the gear teeth may be formed on the outer periphery of the outer member but the construction is equally applicable to bevel wheel input coupling or clutch or the like by suitable arrangement of the respective member.

Figures 9 and 10 illustrate a typical vane type of arrangement which is also shown as a pinion or gear wheel. An inner member 26 is mounted eccentrically on the shaft 27. Vanes 28 are arranged to slide in slots formed in the outer member 29 which can rotate freely on and concentrically with the shaft 27. The vanes are held in contact with the inner member 26 by means of springs 30. Alternatively they could be controlled by hydraulic pressure or other suitable means. Normally the vanes would bear on floating or bearing rings 31 so that the pressure exerted by the vanes on the inner member can be controlled in order to reduce friction and wear. Relative rotation of the inner and outer members in one direction will allow the working fluid to enter via hole 14 and channel 16 and to leave or tend to leave via channel 17 and hole 18. The flow of the working fluid will be controlled by a valve similar to that described above, or other suitable valve, placed at a convenient place on the shaft 27.

Figures 11, 12 and 13 illustrate a typical gear type construction, which is also shown as a pinion or wheel. On shaft 43 is mounted an inner member 44 on the outside of which gear teeth 44a are formed. An outer member 45 can rotate freely on the inner member and carries by pins 46 the gear wheels 47 which mesh with the teeth 44a formed in the inner member 44. The working fluid enters the device through holes 48 via channels 49 and 50 to channel 51. It then passes in the space formed by the gear teeth to channel 52 and thence leaves or tends to leave via channels 53 and 54 to holes 55.

A control valve similar to that shown in Figure 1 is fitted at a suitable point on the shaft 43 and the action of the clutch or coupling is controlled as described above.

Figure 12 shows the gear wheels 47 mounted singly and all acting in parallel while in Figure 13 the gear wheels are shown mounted in pairs. This latter arrangement improves the sealing between channels 51 and 52 and thus allows a higher working pressure to be used.

Figures 14 and 15 show another arrangement of the gear type construction. An outer member 56 which can rotate freely relative to the shaft 57 has gear teeth 56a formed internally thereon. Gear wheels 58 are carried by pins 59 on the inner member 60 which is fixed to the shaft 57. These gear wheels mesh with the internal teeth 56a formed in the outer member 56.

In one arrangement shown in Figure 15 the working fluid enters via hole 61 via channel 62 to channel 63 and leaves or tends to leave channel 64 via channel 65 and hole 66. The working of the clutch or coupling is then similar to that described under Figures 11, 12 and 13.

Where the device is intended to be clutched or coupled for two directions of rotation the nonreturn valves and pressure relief valve may be duplicated to allow for rotation in either direction.

In all the above constructions there may be a slight slip when the clutch is engaged and a slight drag when disengaged, and in those cases where any such action is not permissible I may employ a clutch or coupling of the character described in conjunction with one or more dog clutches or the like, and a similar arrangement may be adopted in cases where occasional heavy overloads must be transmitted.

It will be understood that the invention extends broadly to a clutch or coupling comprising two parts, one of which transmits power to the other through the medium of a fluid which is trapped and compressed in a circuit or space between the two parts, and the invention is therefore not to be limited to the foregoing details of construction which are given purely by way of example to illustrate the nature of the invention and not to limit its scope.

I claim:

1. A hydraulic clutch comprising an outer hollow member rotatable upon an axis, a member rotatable within said hollow member upon an axis parallel to the axis of the outer member, a discontinuous fluid channel between said outer member and said inner member, a first piped connection to said channel, a second piped connection to said channel, movable means within said channel supported by one of said rotatable members each substantially filling the cross sectional area of said channel, an inlet piped means connecting with a source of supply of a fluid, an outlet piped means connecting with said source of supply, a first nonreturn valve connecting the inlet piped means with said first piped connection, a second nonreturn valve connecting the outlet piped means with said second piped connection, a control valve in the first piped connection between the first nonreturn valve and the channel and for connecting the first piped connection and the outlet piped means so that in one extreme position of the valve the flow of fluid is permitted via the inlet piped means the first nonreturn valve the fluid channel the second nonreturn valve and the outlet piped means to restrict the relative rotation of the rotatable members one with the other in one direction only, in the other extreme position of the valve the flow of fluid from the inlet piped means is prevented while the fluid is free to flow from the first piped connection to the outlet piped means direct and between the second piped connection and the outlet piped means via the second nonreturn valve to allow of free relative rotation of the rotatable members one with the other in both directions, and in intermediate positions of the valve the flow of the fluid is partially restricted to partially restrict the relative rotation of the rotatable members one with the other in one direction and a relief valve to control the pressure to which the fluid can rise in the said fluid channel.

2. A hydraulic clutch as claimed in claim 1 in which a third nonreturn valve is provided connecting the inlet piped means with the second piped connection and a fourth nonreturn valve connecting the outlet piped means with the first piped connection, the control valve being arranged for use alternatively in the first piped connection and the second piped connection as required to control the relative rotation of the clutch members in either direction.

3. A hydraulic clutch as claimed in claim 1 in which the movable means within the fluid channel are pistons.

4. A hydraulic clutch as claimed in claim 1 in which the movable means within the fluid channel are radially movable vanes.

5. A hydraulic clutch as claimed in claim 1 in which the movable means within the fluid channel are gear wheels.

THOMAS HINDMARCH.

REFERENCES CITED

The following references are of record in the file of this patent:

UNITED STATES PATENTS

| Number | Name | Date |
|---|---|---|
| 873,978 | Bailey et al. | Dec. 17, 1907 |
| 1,317,415 | Baker et al. | Sept. 30, 1919 |
| 1,935,400 | Junkers | Nov. 14, 1933 |
| 2,146,717 | Berger | Feb. 14, 1939 |
| 2,195,901 | Owens | Apr. 2, 1940 |
| 2,243,653 | Rodaway | May 27, 1941 |